(12) United States Patent
Li et al.

(10) Patent No.: US 8,875,201 B2
(45) Date of Patent: Oct. 28, 2014

(54) METHOD, DEVICE AND SYSTEM FOR IMPLEMENTING SEEKING PLAY OF STREAM MEDIA

(75) Inventors: Hua Li, Shenzhen (CN); Yunsong Fan, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 174 days.

(21) Appl. No.: 12/482,548

(22) Filed: Jun. 11, 2009

(65) Prior Publication Data

US 2009/0249423 A1    Oct. 1, 2009

Related U.S. Application Data

(63) Continuation of application No. PCT/CN2009/070720, filed on Mar. 10, 2009.

(30) Foreign Application Priority Data

Mar. 19, 2008 (CN) .......................... 2008 1 0026890

(51) Int. Cl.
| | | |
|---|---|---|
| H04N 7/173 | (2011.01) | |
| H04N 5/783 | (2006.01) | |
| H04N 21/6587 | (2011.01) | |
| H04N 21/2343 | (2011.01) | |
| H04N 21/2387 | (2011.01) | |
| H04N 21/472 | (2011.01) | |
| H04N 21/433 | (2011.01) | |

(52) U.S. Cl.
CPC ....... *H04N 7/17336* (2013.01); *H04N 21/6587* (2013.01); *H04N 21/234381* (2013.01); *H04N 21/2387* (2013.01); *H04N 21/47202* (2013.01); *H04N 21/4331* (2013.01)
USPC ................. 725/90; 725/91; 725/94; 725/100; 725/116; 725/118; 386/343

(58) Field of Classification Search
USPC ............... 725/88–91, 94, 100, 116, 118, 131, 725/102; 386/343, 350; 709/231; 370/468; 345/545, 547
See application file for complete search history.

(56) References Cited

U.S. PATENT DOCUMENTS 5,659,539 A *  8/1997  Porter et al. .................. 709/231
5,864,682 A    1/1999  Porter et al.
(Continued)

FOREIGN PATENT DOCUMENTS

CN    1312643 A    9/2001
CN    1318253 A    10/2001
(Continued)

OTHER PUBLICATIONS

Office Action issued in corresponding Chinese Patent Application No. 20081002890.8; issued Mar. 9, 2010.
(Continued)

*Primary Examiner* — Pinkal R Chokshi
(74) *Attorney, Agent, or Firm* — Brinks Gilson & Lione

(57) ABSTRACT

A method, a device and a system for implementing seeking play of stream media are provided. The method for implementing seeking play of stream media includes: sending a seeking play request to a stream media server; receiving preview key frames for seeking play sent from the stream media server according to a predefined buffer capacity range and storing the preview key frames for seeking play; displaying the preview key frames for seeking play; and initiating a stream media play according to preview key frames selected by a seeking of a user. This invention can improve the seeking operation experience of the user, control the downloading time of the extracted program, and reduce requirements of storage capability of the stream media terminal.

12 Claims, 10 Drawing Sheets

(56) References Cited

U.S. PATENT DOCUMENTS

| | | | |
|---|---|---|---|
| 6,115,037 A * | 9/2000 | Sumiyoshi et al. | 715/726 |
| 6,327,418 B1 * | 12/2001 | Barton | 386/201 |
| 6,978,082 B1 | 12/2005 | Amano | |
| 7,130,525 B1 | 10/2006 | Iwano | |
| 7,209,437 B1 * | 4/2007 | Hodgkinson et al. | 370/230 |
| 7,418,492 B1 * | 8/2008 | Cohen et al. | 709/224 |
| 7,432,940 B2 * | 10/2008 | Brook et al. | 345/629 |
| 7,535,836 B2 * | 5/2009 | Lund | 370/230 |
| 7,676,820 B2 * | 3/2010 | Snijder et al. | 725/19 |
| 7,720,985 B2 * | 5/2010 | Yoneda | 709/231 |
| 7,733,830 B2 * | 6/2010 | Curcio et al. | 370/333 |
| 8,115,968 B2 * | 2/2012 | Mano et al. | 358/448 |
| 2001/0020981 A1 * | 9/2001 | Jun et al. | 348/426.1 |
| 2002/0073136 A1 * | 6/2002 | Itoh et al. | 709/200 |
| 2003/0135640 A1 * | 7/2003 | Ho et al. | 709/237 |
| 2004/0045020 A1 * | 3/2004 | Witt et al. | 725/13 |
| 2005/0021830 A1 * | 1/2005 | Urzaiz et al. | 709/234 |
| 2005/0028213 A1 * | 2/2005 | Adler et al. | 725/89 |
| 2005/0183120 A1 * | 8/2005 | Jain et al. | 725/46 |
| 2006/0271989 A1 * | 11/2006 | Glaser et al. | 725/111 |
| 2007/0283381 A1 * | 12/2007 | Sidi et al. | 725/32 |
| 2008/0232380 A1 * | 9/2008 | Nakayama | 370/400 |
| 2009/0144781 A1 * | 6/2009 | Glaser et al. | 725/89 |
| 2009/0282444 A1 * | 11/2009 | Laksono et al. | 725/89 |
| 2010/0119206 A1 * | 5/2010 | Craner et al. | 386/68 |
| 2011/0286721 A1 * | 11/2011 | Craner | 386/343 |
| 2011/0314379 A1 * | 12/2011 | Ubillos | 715/721 |

FOREIGN PATENT DOCUMENTS

| | | |
|---|---|---|
| CN | 1361985 A | 7/2002 |
| CN | 1444398 A | 9/2003 |
| CN | 1976440 A | 6/2007 |
| CN | 101025987 A | 8/2007 |
| CN | 101102212 A | 1/2008 |
| CN | 100469140 C | 3/2009 |
| CN | 100525447 C | 8/2009 |
| EP | 0633694 A1 | 1/1995 |
| WO | 97/04596 A2 | 2/1997 |

OTHER PUBLICATIONS

Written Opinion of the International Searching Authority issued in corresponding PCT Patent Application No. PCT/CN2009/070720, mailed Jun. 18, 2009.

Extended European Search Report issued in corresponding European Patent Application No. 09700051.7, mailed Feb. 18, 2010.

Summons to Attend Oral Proceedings issued in corresponding European Patent Application No. 09700051.7, mailed Mar. 13, 2013.

Communication issued in corresponding European Patent Application No. 09700051.7, mailed Oct. 16, 2012.

Office Action issued in corresponding European Patent Application No. 09700051.7, mailed Jul. 15, 2013, 26 pages.

* cited by examiner

METHOD, DEVICE AND SYSTEM FOR IMPLEMENTING SEEKING PLAY OF STREAM MEDIA

CROSS REFERENCE TO RELATED APPLICATIONS

The present application is a continuation application of PCT Application No. PCT/CN2009/070720, filed on Mar. 10, 2009, which claims priority to Chinese Patent Application No. 200810026890.8, filed on Mar. 19, 2008, and the content of which are incorporated herein in their entireties.

FIELD OF THE INVENTION

The present invention relates to the technical field of stream media, and in particular to a method, a device and a system for implementing seeking play of stream media.

BACKGROUND OF THE INVENTION

Stream media refers to that media files are transmitted in a network with streaming transmission technology. A user needs to wait only a short time for viewing the stream media files instead of needing to wait until all stream media files are completely downloaded. When the user views the media files, the background continues downloading the remaining of the stream media files so as to ensure the viewing integrity.

With the development of the stream media technology at present, "Fast Forward", "Rewind" and "Seeking" experience of stream media under the control of a terminal user become a feature of stream media play. However, according to seeking solutions of implementing stream media play in the prior art, a user inputs information via series of User Interfaces (UIs) to obtain a seeking target time point, then the user confirms the input, in this case the screen is switched to the target time point. However, the user concerns only the content of a program, the content is not intuitionistic for the user when the user performs seeking through the target time point, and the target time point for seeking is not well controlled by the user. Therefore, the user usually needs to seek for many times or perform a combination of "Seek" plus "Fast Forward" or "Rewind", so as to attain the purpose of desired seeking play. It is inconvenient for the user.

The conventional technical solution of implementing play of stream media is as follows: when a program is issued, several frame screens of the program source is extracted in a pre-concerted interval, the extracted frame screens are processed/compressed and sent to a stream media server to serve as a part of program information; if a user demands the program, the extracted program that is processed/compressed is downloaded to the local automatically, so that the program source screens extracted at the time point corresponding to a cursor stopping time point can be displayed when the user moves the cursor.

The inventors of the present invention, after searching the prior art, has found that the prior art has the following disadvantages: when the program is playing, the downloading of the extracted program to the local needs a long time; if the time of the program is long and the code stream is heavy, then the size of the extracted program is very large, and this requires a stream media terminal to have a very high storage capability.

SUMMARY OF THE INVENTION

A technical problem to be solved according to the embodiments of the present invention is to provide a method, a device and a system for implementing seeking play of stream media, in order to improve the seeking operation experience of the user, control the downloading time of the extracted program and reduce requirements of storage capability of the stream media terminal.

An embodiment of the present invention provides the following technical solutions.

A method for seeking play of stream media includes: sending a seeking play request to a stream media server; receiving preview key frames for seeking play sent from the stream media server according to a predefined buffer capacity range and storing the preview key frames for seeking play; displaying the preview key frames for seeking play; and initiating a stream media play according to preview key frames selected by a seeking of a user.

A stream media terminal includes: a seeking play request sending unit, adapted to send a seeking play request to a stream media server; a receiving and processing unit, adapted to receive preview key frame data for seeking play sent from the stream media server according to a predefined buffer capacity range and store the preview key frame data; a preview display processing unit, adapted to display the preview key frames received and stored by the receiving and processing unit in a preview manner according to a seeking operation request from a user; and a seeking play processing unit, adapted to initiate a stream media play according to preview key frames selected by a seeking of the user.

A stream media server includes: a receiving and processing unit, adapted to receive and process a seeking play request sent from a stream media terminal; a selecting and processing unit, adapted to select preview key frame data for seeking play according to the seeking play request received by the receiving and processing unit; and a sending and processing unit, adapted to send the preview key frame data for seeking play selected by the selecting and processing unit to the stream media terminal.

A stream media system includes a stream media terminal and a stream media server, where the stream media terminal is adapted to: send a seeking play request to the stream media server; receive preview key frame data for seeking play sent from the stream media server according to a predefined buffer capacity range and store the preview key frame data; display the preview key frame data in a preview manner according to a seeking operation request from the user; and initiate a stream media play according to preview key frames selected by a seeking of the user; and the stream media server is adapted to: receive and process the seeking play request sent from the stream media terminal; select the preview key frame data for seeking play according to the seeking play request; and send the preview key frame data for seeking play to the stream media terminal.

A method for seeking play of stream media includes: receiving and processing a seeking play request sent from a stream media terminal; selecting preview key frame data for seeking play according to the seeking play request; and sending the selected preview key frame data for seeking play to the stream media terminal.

According to the technical solutions of the embodiments of the present invention, for example, the stream media terminal may send a seeking play request to the stream media server according to a request for initiating a seeking operation from the user; receive preview key frame data for seeking play sent from the stream media server and store the preview key frame data; display the preview key frame data according to a seeking operation request from the user; and initiate a stream media play according to preview key frames selected by a seeking of the user. The stream media terminal can display frames to the user directly in a preview manner in the process of seeking operation, which brings a seeking preview experience of "What You See Is What You Get" to the user, improving the seeking operation experience of the user. After the user initiates the seeking operation, the stream media terminal may control to receive the preview key frame data for seeking play from the stream media server and store the preview key frame data. Therefore, the time of downloading of the extracted program to the local is controllable, and the requirement for the storage capability of the stream media terminal is reduced.

DETAILED DESCRIPTION OF THE EMBODIMENTS

Figure 1:
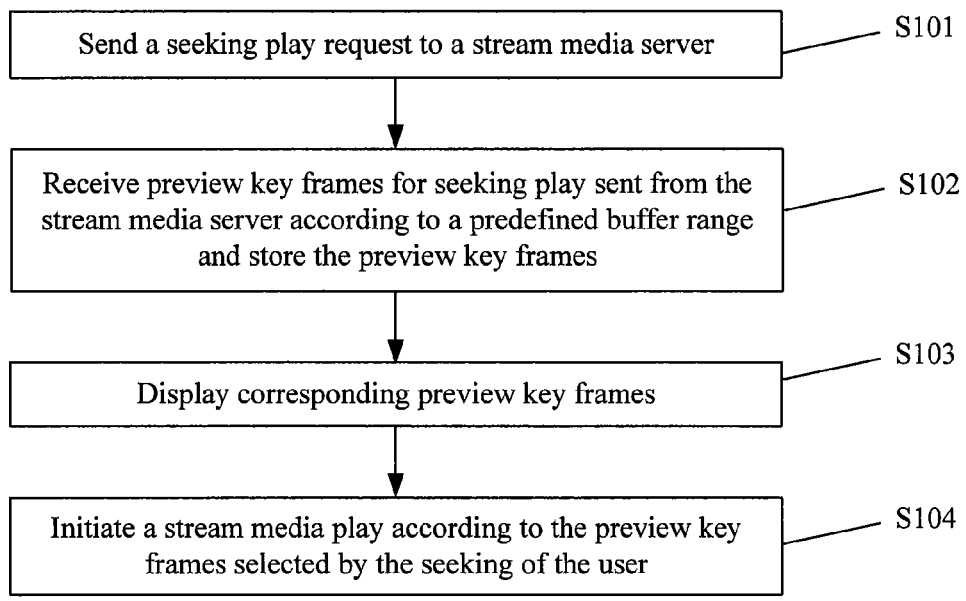
FIG. 1 is a flowchart diagram of a method for seeking play of stream media according to an embodiment of the present invention.

FIG. 1 is a flowchart diagram of a method for seeking play of stream media according to an embodiment of the present invention.

This embodiment is described by taking a stream media seeking play processing at a stream media terminal side as an example. The method according to the embodiment includes the blocks as follows.

Block S101: A seeking play request is sent to a stream media server. In particular, the stream media terminal sends the seeking play request according to a request for initiating a seeking operation from a user, e.g. step information and seeking direction information for selecting preview key frames may be carried in the seeking play request. In this way, the stream media server may select the preview key frames according to the step information and the seeking direction information sent from the stream media terminal. The selection of the preview key frames may be started from a current time point according to the step information and the seeking direction information. Alternatively, the step information and the seeking direction information of the preview key frames may not be carried in the seeking play request; however, the selection of the preview key frames is set by the stream media server in other manners, such as a default setting of the stream media server.

Figure 2:
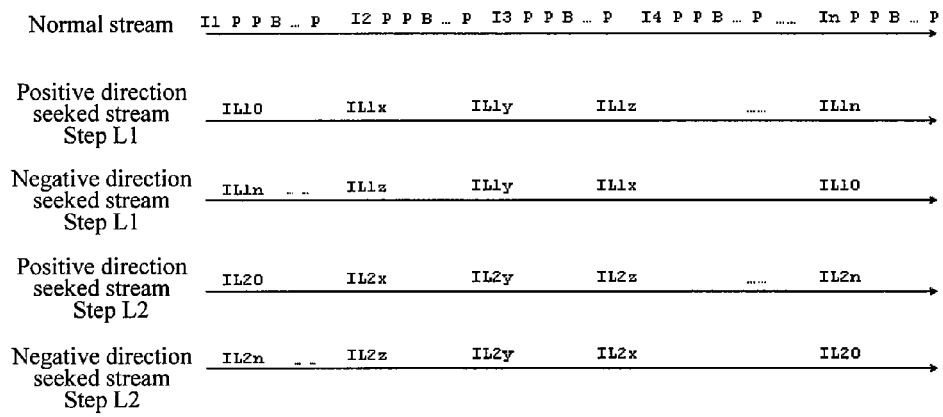
FIG. 2 is a diagram of an embodiment of the present invention, which illustrates that a stream media server selects key frames according to a step and a direction designated by a stream media terminal and sends the key frames.

A detailed embodiment is described, for example, FIG. 2 is a diagram of an embodiment of the present invention, which illustrates that a stream media server selects key frames according to a step and a direction designated by a stream media terminal and sends the key frames. In case of a normal stream, frame data is sent in a sequence of a key frame I1, a prediction code frame P, a prediction code frame P, a bidirectional prediction code frame B. In this embodiment, the stream media terminal needs to send seeking direction and step information to the stream media server, i.e. the steps are all L1 or L2. The stream media server determines the seeking direction as a positive direction or a negative direction, selects the preview key frames in a time interval of the step L1 or L2 from stored stream data and sends the selected preview key frames to the stream media terminal. For example, if the step is L1, the preview key frames IL10, IL1$x$, IL1$y$ . . . IL1$n$ are selected and sent to the stream media terminal, or, if the step is L2, the preview key frames IL20, IL2$x$, IL2$y$ . . . IL2$n$ are selected and sent to the stream media terminal.

Block S102: The preview key frames for seeking play sent from the stream media server are received and stored according to a predefined buffer capacity range. The predefined buffer capacity range may be set by default at the stream media terminal, or may be set by the user according to his requirements. In addition, specifically, for example the stream media server may possibly send the preview key frames for seeking play in a press manner. The press manner refers to that whenever the stream media terminal can receive data, the stream media server sends data to the stream media terminal immediately until the stream media terminal cannot receive data any further. The press manner can reduce interaction overload between the stream media terminal and the stream media server to the maximum extent, thereby reducing communication duration and improving user experience.

For example, a window size of a seeking buffer, Buffer, of the stream media terminal at the beginning of the seeking is WS. The window size decreases by 1 whenever the stream media terminal receives a frame. Once the window size is 0, the stream media server ceases sending data. If the seeking buffer window of the terminal changes, the terminal informs the server of the changing, and the server sends media data.

In this embodiment, a buffer may also be maintained by the stream media terminal. The stream media server detects that a state of an available buffer window of the stream media terminal is 0 via a detection mechanism. On detecting that the available buffer window is 0, the stream media server may initiate a resending mechanism to continue sending the preview key frame data.

It should be noted that the stream media terminal does not send any response to the stream media server during normal sending. However, the stream media terminal sends a response message to the stream media server to inform the stream media server that the stream media terminal is unable to receive data, once the available buffer window approaches 0 or is 0 (the condition can be set to be approaching 0 or being 0 according to implementing mechanisms). In this case, the stream media server records the time point where the stream media terminal receives the data, so that the stream media server may begin to start messages corresponding to a time point following the recorded time point to the stream media terminal (the resending mechanism). If the stream media terminal has a non-0 window, the stream media terminal sends a response to the stream media server; otherwise, the stream media server keeps sending the frame.

Figure 3:
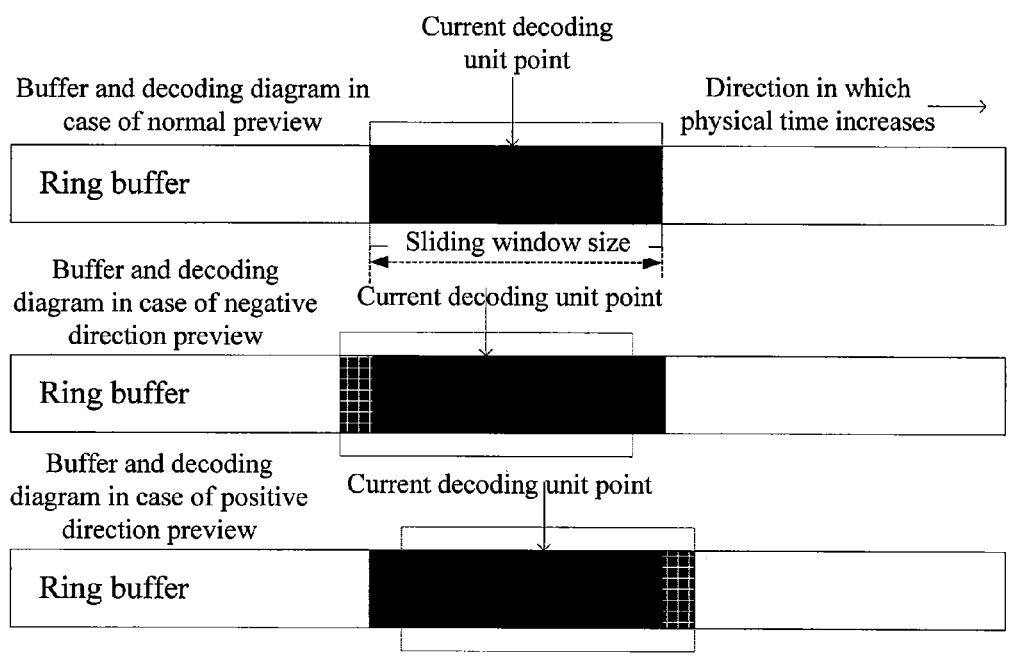
FIG. 3 is a diagram of a control mode of a decoding buffer sliding window in a stream media terminal according to an embodiment of the present invention.

Therefore, referring to FIG. 3 for example, the stream media terminal may set a decoding buffer sliding window, WS, having a certain buffer capacity, adapted to buffer stream media data. If a user performs a seeking operation, a video output is maintained as paused, the stream media terminal controls the receiving and storing of the preview key frames for seeking play sent from the stream media server according to the decoding buffer sliding window, and maintains a current decoding point of the decoding buffer sliding window to point to preview key frames at an intermediate position of the sliding window to the best of the stream media terminal's ability. The current decoding points to frames that should be decoded to output by a current terminal player. If the user seeks the stream media hop-by-hop through clicking, the current decoding point of the decoding buffer sliding window points to key frames corresponding to a step with every click.

As illustrated in FIG. 3, if a seeking operation request of a user indicates a positive direction operation, the decoding buffer sliding window moves right; if a seeking operation request of a user indicates a negative direction operation, the decoding buffer sliding window moves left. Decoded key frames are discarded only if the key frames do not fall into the range of the decoding buffer sliding window; otherwise, the decoded key frames are stored in a buffer zone of the decoding buffer sliding window.

In addition, if the user changes the direction in a seeking operation request, a beginning time of the decoding buffer sliding window of preview key frames to be resent is reported to the stream media server. For example, if an original seeking operation request indicates a rightward operation, i.e. the direction in the seeking operation request is positive, the decoding buffer sliding window is full; after the decoding buffer sliding window moves a unit leftwards, i.e. the seeking operation direction is negative, a time point where a leftmost frame locates is reported to the stream media server, so that the stream media server begins to send preview key frame data corresponding to a time point following the reported time point, to ensure that the data in the buffer zone of the decoding buffer sliding window is continuous in terms of time.

Block S103: Corresponding preview key frame is displayed. What is displayed is the key frame pointed by the current decoding point. Specifically, the frames are displayed according to the seeking operation request of the user. For example, if the user seeks the stream media hop by hop through clicking, corresponding preview key frames are displayed respectively to the user in the step direction.

Block S104: A stream media play is initiated according to the preview key frame selected by the seeking of the user. For example, after the user seeks a certain frame of the preview key frames, the stream media play is initiated from the selected preview key frame for seeking.

It should be noted that after detecting that the user ceases the seeking operation, e.g. detecting that the user has ceased the seeking operation in excess of a specified time, the procedure proceeds to a play state, i.e. plays stream media from the current sought key frame.

It can be known from this embodiment that, the stream media terminal can display frames to the user directly in a preview manner in the process of seeking operation, which brings a seeking preview experience of "What You See Is What You Get" to the user, improving the seeking operation experience of the user. After the user initiates the seeking operation, the stream media terminal may control the receiving and storing of the preview key frame data for seeking play from the stream media server according to the predefined buffer capacity range. For example, the stream media terminal is adapted to control the buffering of the stream media data according to the decoding buffer sliding window with a certain buffer capacity. Therefore, the time of downloading of the extracted program to the local is controllable, and the requirement for the storage capability of the stream media terminal is reduced.

An exemplary embodiment in which a stream media terminal interacts with a stream media server to implement stream media seeking play is described as below.

Figure 4:
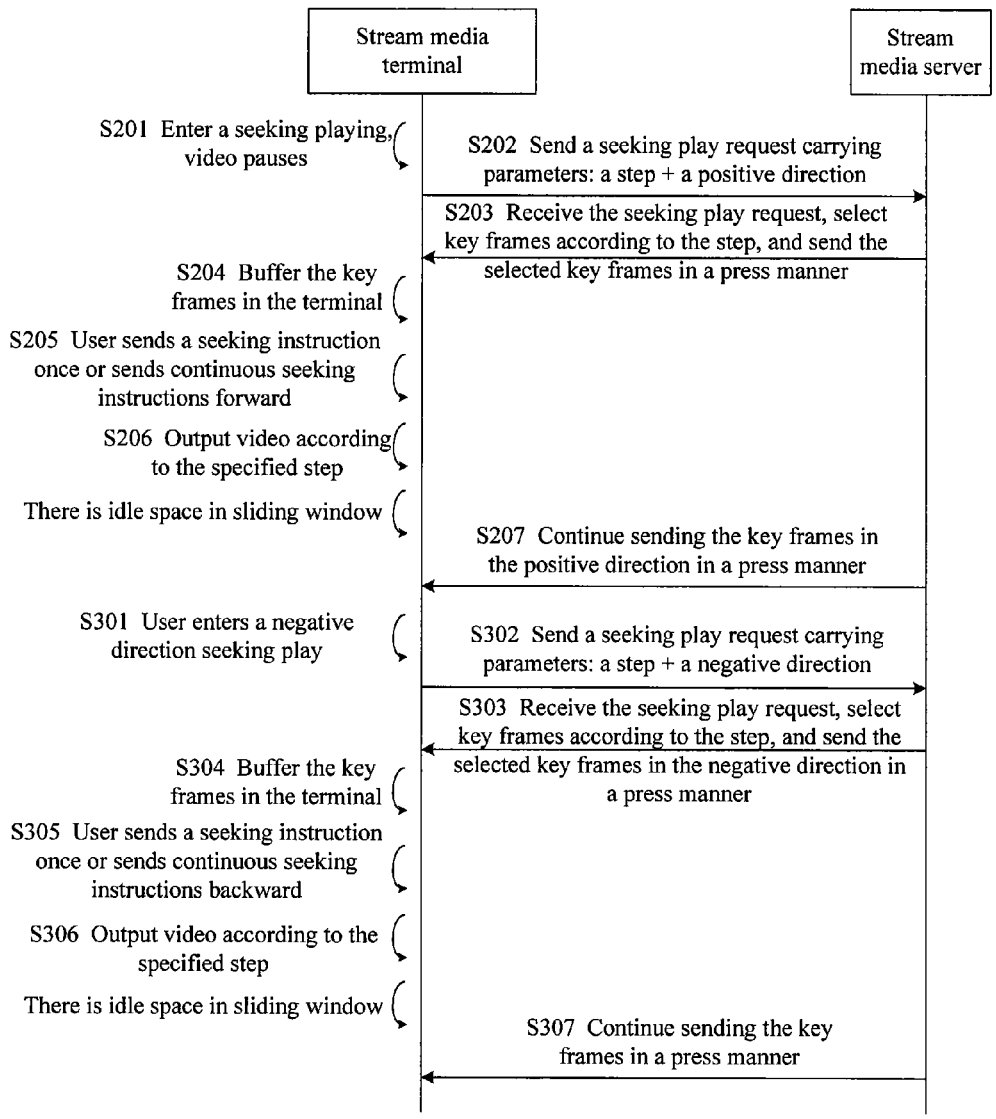
FIG. 4 is a flowchart diagram of an embodiment of the present invention, which illustrates that a stream media terminal interacts with a stream media server to implement seeking play of stream media.

FIG. 4 is a flowchart diagram of an embodiment of the present invention, which illustrates that a stream media terminal interacts with a stream media server to implement seeking play of stream media.

In this embodiment, after a user enters a seeking play, video pauses (block S201); a stream media terminal sends a seeking play request to a stream media server, the seeking play request carrying a specified step and a positive seeking direction (block S202); the stream media server receives the seeking play request, selects preview key frames in the positive direction according to the specified step, and sends the selected preview key frames to the stream media terminal in a press manner (block S203); the stream media terminal buffers the preview key frames from the stream media server (block S204); then, the user sends a seeking instruction once or sends continuous seeking instructions forward, the stream media terminal outputs and displays the preview key frames according to the specified step (blocks S205-S206); where the stream media terminal may maintain a decoding buffer sliding window for buffering the preview key frames, and if the decoding buffer sliding window is idle, the stream media server may continue sending the preview key frames in a press manner (block S207).

A procedure of a negative direction seeking operation is similar to that of the above positive direction seeking operation. A user enters a negative direction seeking play, video pauses (block S301); a stream media terminal sends a seeking play request to a stream media server, the seeking play request carrying a specified step and a negative seeking direction (block S302); the stream media server receives the seeking play request, selects preview key frames in the negative direction according to the specified step, and sends the selected preview key frames to the stream media terminal in a press manner (block S303); the stream media terminal buffers the preview key frames from the stream media server (block S304); then, if the user sends a seeking instruction once or sends continuous seeking instructions backward, the stream media terminal outputs and displays the preview key frames according to the specified step (blocks S305-S306); where the stream media terminal may maintain a decoding buffer sliding window for buffering the preview key frames, and if the decoding buffer sliding window is idle, the stream media server may continue sending the preview key frames in a press manner (block S307).

It can be known from the method for implementing seeking play of stream media in this embodiment that, the stream media terminal can display frames to the user directly in a preview manner in the process of seeking operation regardless of the positive direction seeking play or the negative direction seeking play, which brings a seeking preview experience of "What You See Is What You Get" to the user, improving the seeking operation experience of the user. After the user initiates the seeking operation, the stream media terminal may control to receive the preview key frame data for seeking play from the stream media server and stores the preview key frame data. For example, the stream media terminal is adapted to control the buffering of the stream media data according to the decoding buffer sliding window with a certain buffer capacity. Therefore, the time of downloading of the extracted program to the local is controllable, and the requirement for the storage capability of the stream media terminal is reduced.

The above illustrates a method for implementing seeking play of stream media according to an embodiment of the present invention. A device and a system for implementing seeking play of stream media according to embodiments of the present invention are described as below with reference to the drawings.

Figure 5:
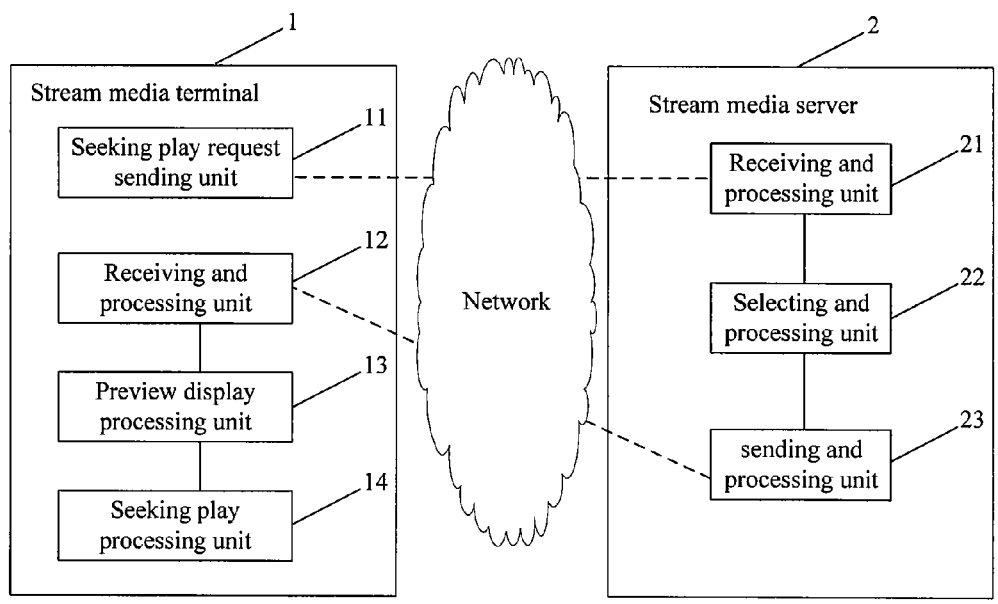
FIG. 5 is a structural diagram of a stream media system according to an embodiment of the present invention.

FIG. 5 is a structural diagram of a stream media system according to an embodiment of the present invention.

In this embodiment, the stream media system includes a stream media terminal 1 and a stream media server 2, which are described respectively as below.

The stream media terminal is adapted to: send a seeking play request to the stream media server; receive preview key frame data for seeking play from the stream media server according to a predefined buffer capacity range and store the preview key frame data; display the preview key frame data in a preview manner according to a seeking operation request from the user; and initiate a stream media play according to preview key frames selected by the seeking of the user.

The stream media server is adapted to: receive and process the seeking play request from the stream media terminal; select the preview key frame data for seeking play according to the seeking play request; and send the preview key frame data for seeking play to the stream media terminal.

For implementing the seeking play of the stream media, as illustrated in FIG. 5, the stream media terminal 1 may include: a seeking play request sending unit 11, a receiving and processing unit 12, a preview display processing unit 13, and a seeking play processing unit 14.

Figure 6:
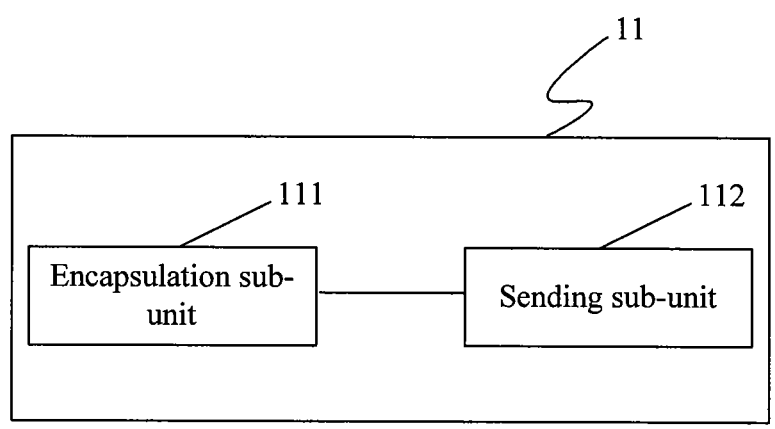
FIG. 6 is a structural diagram of a seeking play request sending unit of a stream media terminal according to an embodiment of the present invention.

In this embodiment, the seeking play request sending unit 11 is mainly adapted to send the seeking play request to the stream media server. Specifically, the seeking play request sending unit 11 is mainly adapted to send the seeking play request according to a request for initiating a seeking operation from a user. For example, after the user operates on a seeking play bar to initiate a seeking operation, the seeking play request sending unit 11 may send a seeking play request to the stream media server. As an optional embodiment, referring to FIG. 6, the seeking play request sending unit 11 may include:

an encapsulation sub-unit 111, adapted to encapsulate the seeking play request carrying step and/or seeking direction information; and a sending sub-unit 112, adapted to send the seeking play request carrying the step and/or seeking direction information, encapsulated by the encapsulation sub-unit 111, to the stream media server.

Figure 7:
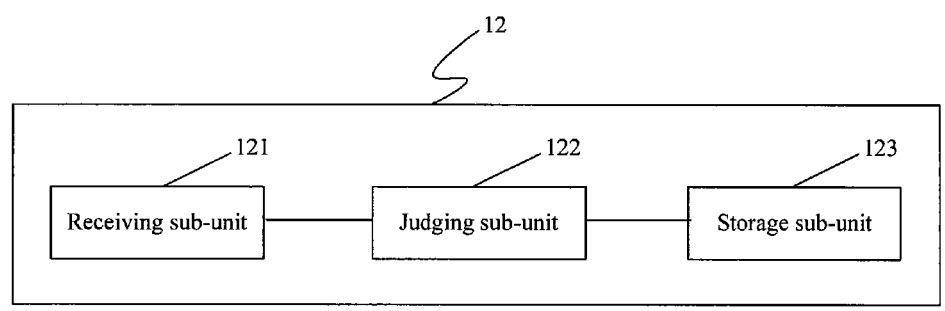
FIG. 7 is a structural diagram of a receiving and processing unit of a stream media terminal according to an embodiment of the present invention.

In this embodiment, the receiving and processing unit 12 is mainly adapted to receive the preview key frame data for seeking play from the stream media server according to the predefined buffer capacity range and store the preview key frame data. Specifically, for example, referring to the above description, a decoding buffer sliding window WS with a certain buffer capacity may be set for buffering stream media data. The receiving and processing unit 12 may control the receiving and storing of the preview key frames for seeking play from the stream media server according to the decoding buffer sliding window, and maintain a current decoding point of the decoding buffer sliding window to point to an intermediate position of the sliding window to the best of the stream media terminal's ability. If the user seeks the stream media hop by hop through clicking, the current decoding point of the decoding buffer sliding window points to key frames corresponding to a step with every click. As an optional embodiment, referring to FIG. 7, the receiving and processing unit 12 may include:

a receiving sub-unit 121, adapted to receive the preview key frame data for seeking play from the stream media server;

a judging sub-unit 122, adapted to judge whether the stored preview key frame data for seeking play reaches a limitation of the decoding buffer sliding window; and a storage sub-unit 123, adapted to store the preview key frame data received by the receiving sub-unit 121, if the judging sub-unit 122 determines that the stored preview key frame data for seeking play does not reach the limitation of the decoding buffer sliding window.

In this embodiment, a preview display processing unit 13 is mainly adapted to display the stored preview key frame data in a preview manner according to the seeking operation request from the user. For example, referring to the above description, if the user seeks the stream media hop by hop through clicking, the preview display processing unit 13 may display corresponding preview key frames respectively to the user in the step direction similarly.

In this embodiment, the seeking play processing unit 14 is mainly adapted to initiate a stream media play according to the preview key frames selected by the seeking of the user. For example, referring to the above description, after the user seeks according to a preview key frame, the stream media play is initiated from the preview key frame selected by the seeking of the user.

This embodiment further includes an operation detecting unit adapted to detect an operation of the user. Specifically, if the operation detecting unit detects that the user initiates the seeking operation, the operation detecting unit is adapted to inform the seeking play request sending unit 11 that, e.g., the operation detecting unit detects that the user operates on a seeking play bar to initiate the seeking operation; and if the operation detecting unit detects that the user performs the seeking operation, the operation detecting unit is adapted to inform the preview display processing unit 13 that, e.g., the operation detecting unit detects that the user seeks the stream media hop by hop through clicking; and if the operation detecting unit detects that the user initiates the stream media play, the operation detecting unit informs the seeking play processing unit 14.

Figure 8:
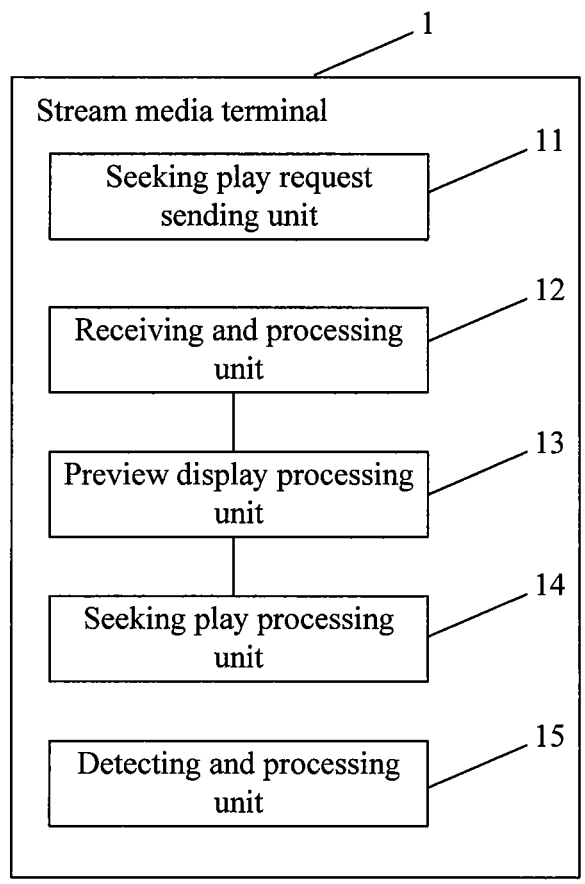
FIG. 8 is a structural diagram of a stream media terminal according to an embodiment of the present invention.

In addition, FIG. 8 is another structural diagram of a stream media terminal according to an embodiment of the present invention.

In this embodiment, the stream media terminal includes: a seeking play request sending unit 11, a receiving and processing unit 12, a preview display processing unit 13, a seeking play processing unit 14, and further includes a detecting and processing unit 15.

Figure 9:
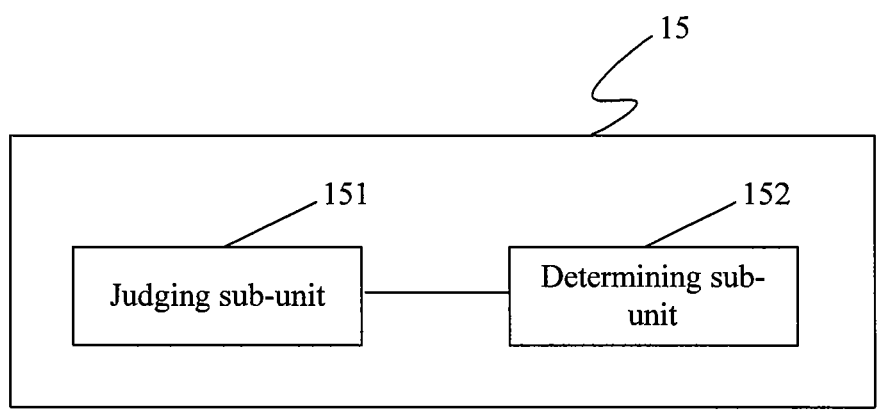
FIG. 9 is a structural diagram of a detecting and processing unit of a stream media terminal according to an embodiment of the present invention.

In this embodiment, the detecting and processing unit 15 is mainly adapted to inform the seeking play processing unit 14 to initiate a stream media play on detecting that a user ceases a seeking operation. For example, as an optional embodiment, referring to FIG. 9, the detecting and processing unit 15 may include:

a judging sub-unit 151, adapted to judge whether a time since the user ceases a seeking operation exceeds a predefined time; specifically, for example the predefined time may be set in default, or may be set by the user; and a determining sub-unit 152, adapted to determine that the determining sub-unit 152 detects that the user ceases the seeking operation, and inform the seeking play processing unit 14 to initiate the stream media play, if the judging sub-unit 151 judges that the time since the user ceases a seeking operation exceeds the predefined time; otherwise, determine that the determining sub-unit 152 does not detect that the user ceases the seeking operation and make no processing.

For implementing play of the stream media, referring to FIG. 5, the stream media server 2 may include: a receiving and processing unit 21, a selecting and processing unit 22, and a sending and processing unit 23.

Figure 10:
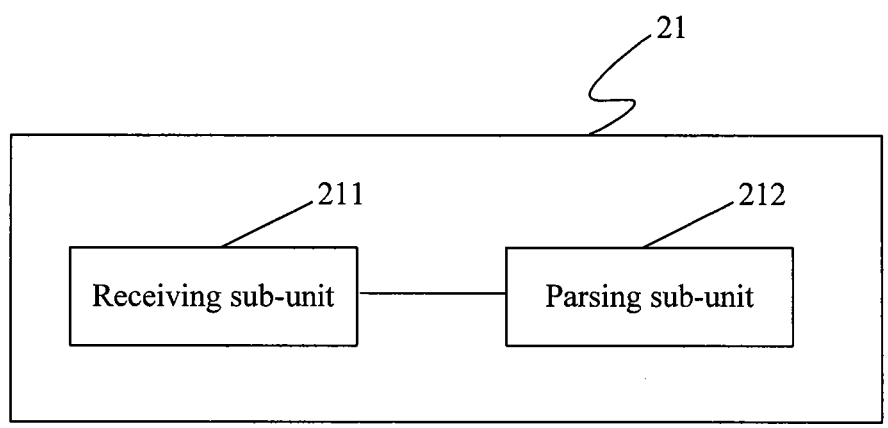
FIG. 10 is a structural diagram of a receiving and processing unit of a stream media server according to an embodiment of the present invention.

In this embodiment, the receiving and processing unit 21 is mainly adapted to receive and process the seeking play request sent from the stream media terminal. In particular, the receiving and processing unit 21 may receive the seeking play request sent from the stream media terminal directly, or the receiving and processing unit 21 parses the seeking play request to obtain step information and seeking direction information carried in the seeking play request on receiving the seeking play request. For example, as an optional embodiment referring to FIG. 10, the receiving and processing unit 21 may include:

a receiving sub-unit 211, adapted to receive the seeking play request sent from the stream media terminal; and a parsing sub-unit 212, adapted to parse the seeking play request received by the receiving sub-unit 211 to obtain the step information and the seeking direction information for selecting the preview key frames.

In this embodiment, the selecting and processing unit 22 is mainly adapted to select the preview key frame data for seeking play according to the seeking play request. Specifically, for example, the selecting and processing unit 22 may perform the selection according to the step information and the seeking direction information carried in the seeking play request, or the selecting and processing unit 22 may perform the selection according to step and direction information which is set by the stream media server, or the selecting and processing unit 22 may perform the selection in other ways, which is not described in detail.

In this embodiment, the sending and processing unit 23 is mainly adapted to send the selected preview key frame data for seeking play to the stream media terminal. Specifically, referring to the above description, the sending and processing unit 23 may send the selected preview key frame data in a press manner. In other words, once it is detected that the buffer zone of the stream media terminal for buffering the preview key frames is idle, the stream media terminal is initiated to send the preview key frames; however, if the buffer zone of the stream media terminal for buffering the preview key frames is full, the sending and processing unit 23 ceases sending the preview key frames to the stream media terminal.

It can be known from the stream media system for implementing seeking play of stream media according to the above embodiment that, the stream media terminal can display frames to the user directly in a preview manner in the process of seeking operation, which brings a seeking preview experience of "What You See Is What You Get" to the user, improving the seeking operation experience of the user. After the user initiates the seeking operation, the stream media terminal may the receiving and storing of the preview key frame data for seeking play from the stream media server. For example, the stream media terminal is adapted to control the buffering of the stream media data according to the decoding buffer sliding window with a certain buffer capacity. Therefore, the time of downloading of the extracted program to the local is controllable, and the requirement for the storage capability of the stream media terminal is reduced.

From the above description of the embodiments, those skilled in the art can clearly understand that the present invention can be implemented by means of software plus necessary general hardware platform, though the present invention can also be implemented by hardware. However, in most cases, the former is a better implementing way. Based on this understanding, the technical solution of the present invention or parts thereof that contribute to the prior art may be substantially embodied as a software product. The computer software product is stored in a storage media, including several instructions adapted to instruct a computer device (may be a personal computer, a server, or a network device, etc.) to execute the methods according to the embodiments of the present invention.

The above description is merely preferred embodiments of the present invention, which does not limit the scope of the present invention. Any variations, equivalents and modifications made within the disclosure of the present invention shall fall into the scope of the present invention as defined in the attached claims.

The invention claimed is:

1. A method for seeking play of stream media, comprising:
sending a seeking play request to a stream media server by a stream media terminal;
receiving preview key frames for seeking play sent from the stream media server by the stream media terminal according to a predefined buffer capacity range and storing the preview key frames for seeking play;
sending a response message to the stream media server to inform the stream media server that the stream media terminal is unable to receive data at a time point when the predefined buffer capacity range is not available, such that the predefined buffer capacity range can no longer store another incoming preview key frame;
displaying the preview key frames for seeking play according to the seeking play request of a user when the user seeks the stream media hop by hop through clicking; and
initiating a stream media play according to preview key frames selected by a seeking of a user,
wherein the stream media server continues sending the preview key frame corresponding to a time point following the time point when the predefined buffer capacity range is not available.

2. The method for seeking play of stream media according to claim 1, wherein the receiving the preview key frames for seeking play sent from the stream media server according to the predefined buffer capacity range and storing the preview key frames for seeking play comprises:
receiving preview key frame data for seeking play sent from the stream media server according to a predefined decoding buffer sliding window;
storing the preview key frame data; and
maintaining a current decoding point of the decoding buffer sliding window to point to preview key frames at an intermediate position of the decoding buffer sliding window.

3. The method for seeking play of stream media according to claim 2, wherein the user seeks the stream media hop by hop through clicking, the current decoding point of the decoding buffer sliding window points to key frames corresponding to a step with every click;
if the seeking operation request of the user indicates a positive direction operation, the decoding buffer sliding window moves in the positive direction;
if the seeking operation request of the user indicates a negative direction operation, the decoding buffer sliding window moves in the negative direction;
decoded key frames are discarded if the decoded key frames do not fall into the range of the decoding buffer sliding window; otherwise, the decoded key frames are stored in a buffer zone of the decoding buffer sliding window.

4. The method for seeking play of stream media according to claim 3, further comprising:
if the user changes the direction in the seeking operation request, reporting, a beginning time of the decoding buffer sliding window of preview key frames to be resent by the stream media server, to the stream media server.

5. The method for seeking play of stream media according to claim 1, wherein the seeking play request comprises: step information and seeking direction information for selecting the preview key frames, wherein the preview key frames for seeking play sent from the stream media server are selected according to a direction for selecting the preview key frames determined by the seeking direction information and the step information.

6. The method for seeking play of stream media according to claim 1, further comprising: determining a first time when the user has ceased the seeking operation; and entering a play state upon detecting that an elapsed time since the first time exceeds a predefined time.

7. A non-transitory machine-readable storage medium having stored thereon a computer program comprising at least one code section for implementing a stream media terminal, the at least one code section being executable by a machine for causing the machine to perform acts of:
sending a seeking play request to a stream media server;
receiving preview key frame data for seeking play sent from the stream media server according to a predefined buffer capacity range and storing the preview key frame data;
sending a response message to the stream media server to inform the stream media server that the stream media terminal is unable to receive data at a time point when the predefined buffer capacity range is not available, such that the predefined buffer capacity range can no longer store another incoming preview key frame;
displaying the preview key frames in a preview manner according to a seeking operation request from a user when the user seeks the stream media hop by hop through clicking; and
initiating a stream media play according to preview key frames selected by a seeking of the user,
wherein the stream media server continues sending the preview key frame corresponding to a time point following the time point when the predefined buffer capacity range is not available.

8. The non-transitory machine-redable storage medium according to claim 7, wherein the act of sending a seeking play request to a stream media server comprising:
encapsulating the seeking play request carrying step and/or seeking direction information; and
sending the seeking play request carrying the step and/or seeking direction information, to the stream media server.

9. The non-transitory machine-redable storage medium according to claim 7, wherein the act of receiving preview key frame data for seeking play sent from the stream media server according to a predefined buffer capacity range and storing the preview key frame data comprises:
receiving the preview key frame data for seeking play from the stream media server;
judging whether the stored preview key frame data for seeking play reaches a limitation of the decoding buffer sliding window; and
storing the received preview key frame data received, if the stored preview key frame data for seeking play does not reach the limitation of the decoding buffer sliding window.

10. The non-transitory machine-readable storage medium according to claim 7, wherein the at least one code section causes the machine to perform act of:
instructing the seeking play processing unit to initiate a stream media play on detecting that the user ceases the seeking operation.

11. The non-transitory machine-redable storage medium according to claim 10, wherein the act of instructing the seeking play processing unit to initiate a stream media play on detecting that the user ceases the seeking operation comprises:
determining whether a time since the user ceases the seeking operation exceeds a predefined time; and
initiating the stream media play, upon detecting that an elapsed time since a first time determined when the user has ceased the seeking operation exceeds a predefined time; otherwise, determining that the user has not ceased the seeking operation and performed no processing.

12. A method for seeking play of stream media, comprising a stream media terminal and a stream media server, the stream media terminal being connected with a stream media server via a network, wherein the stream media terminal is adapted to:
sending a seeking play request to the stream media server;
receive preview key frame data for seeking play sent from the stream media server according to a predefined buffer capacity range and store the preview key frame data;
sending a response message to the stream media server to inform the stream media server that the stream media terminal is unable to receive data at a time point when the predefined buffer capacity range is not available, such that the predefined buffer capacity range can no longer store another incoming preview key frame;
displaying the preview key frame data in a preview manner according to a seeking operation request from the user when the user seeks the stream media hop by hop through clicking; and
initiating a stream media play according to preview key frames selected by a seeking of the user;
wherein the stream media server is adapted to:
receiving and processing the seeking play request sent from the stream media terminal;
selecting the preview key frame data for seeking play according to the seeking play request;
sending the preview key frame data for seeking play to the stream media terminal; and continue sending by the stream media server, the preview key frame corresponding to a time point following the time point when the predefined buffer capacity range is not available.

* * * * *